(12) United States Patent
Tsai

(10) Patent No.: US 8,454,033 B2
(45) Date of Patent: Jun. 4, 2013

(54) HANDCART

(76) Inventor: Haiming Tsai, Tainan (TW)

( * ) Notice: Subject to any disclaimer, the term of this patent is extended or adjusted under 35 U.S.C. 154(b) by 310 days.

(21) Appl. No.: 13/034,724

(22) Filed: Feb. 25, 2011

(65) Prior Publication Data

US 2011/0175308 A1     Jul. 21, 2011

Related U.S. Application Data

(63) Continuation-in-part of application No. 12/657,274, filed on Jan. 19, 2010, now Pat. No. 8,100,417.

(51) Int. Cl.
*B62B 1/00* (2006.01)
*B62B 3/00* (2006.01)

(52) U.S. Cl.
USPC .................................. 280/47.18; 280/47.371

(58) Field of Classification Search
USPC ................. 280/47.18, 47.17, 47.315, 47.34, 280/47.371; 403/161, 162; 16/436, 437, 900
See application file for complete search history.

(56) References Cited

U.S. PATENT DOCUMENTS

| | | | | |
|---|---|---|---|---|
| 3,655,297 A | * | 4/1972 | Bolen et al. | 403/102 |
| 4,448,434 A | * | 5/1984 | Anderson | 280/47.28 |
| 4,969,660 A | * | 11/1990 | Spak | 280/47.29 |
| 5,468,005 A | * | 11/1995 | Yang | 280/47.29 |
| 6,101,678 A | * | 8/2000 | Malloy et al. | 280/47.371 |
| 6,341,406 B1 | * | 1/2002 | Beckman | 280/47.34 |
| 6,877,764 B2 | * | 4/2005 | Sagol | 280/47.371 |
| 7,445,231 B1 | * | 11/2008 | Tsai | 280/47.17 |
| 7,475,888 B2 | * | 1/2009 | Craig et al. | 280/47.18 |
| 7,600,765 B2 | * | 10/2009 | Tsai | 280/47.18 |
| 7,784,816 B2 | * | 8/2010 | Jian | 280/651 |
| 2004/0201186 A1 | * | 10/2004 | Tornabene et al. | 280/30 |
| 2008/0197590 A1 | * | 8/2008 | Tsai | 280/47.18 |

* cited by examiner

*Primary Examiner* — Jeffrey J Restifo
*Assistant Examiner* — James M Dolak
(74) *Attorney, Agent, or Firm* — Bacon & Thomas, PLLC

(57) ABSTRACT

The invention relates to a handcart composed of a main frame, four wheels properly assembled with a frame rod of the main frame, a grip, two positioning sleeves combined movably with the grip, and two joint assemblies installed between the main frame and the grip for changeably connecting the main frame with the grip. The grip together with the positioning sleeves can be aligned flat or become 90° relative to the main frame by means of the joint assemblies. Then the handcart can be transformed into a two-wheel handcart or a four-wheel one by handling the grip through movement of the pivotal bases of the joint assemblies.

5 Claims, 14 Drawing Sheets

HANDCART

BACKGROUND OF THE INVENTION

1. Field of the Invention

This invention relates to a handcart, particularly to one able to be alternatively used as a two-wheel or a four-wheel handcart by means of two joint assemblies.

2. Description of the Prior Art

Commonly, a conventional two-wheel handcart and four-wheel handcart are used as two different means, depending on practical need. In other words, each of the conventional handcarts can work only in a single way. With different shapes or packages of objects, some of them are suitable to be delivered by the two-wheel handcart and some are suitable to be delivered by the four-wheel handcart.

Therefore, if both of the handcarts have to be used alternatively, they have to be of course prepared separately, not only increasing cost, but also occupying more space. Although the U.S. Pat. Nos. 6,938,905 and 7,600,765 patented by this inventor were provided to overcome the defects mentioned above, but it still have something to be improved, such as disassembly and uneasiness in positioning stably the grip bent against the main frame and positioning by the pivotal base of the joint provided with an U-shaped opening, etc.

SUMMARY OF THE INVENTION

The main objective of this invention is to offer a handcart alternately usable as a two-wheel or a four-wheel handcart.

The other objective of this invention is to offer a positioning sleeve for stably assembling a grip, a main frame and a joint assembly together so that the pushcart is easily and stably assembled as a four-wheel handcart.

The main characteristics of the invention are two joint assemblies consisting of two pivotal blocks, two left pivotal bases, two right bases. The pivotal blocks are respectively provided with two aligned projections in an intermediate portion, and the two left and the two right pivotal bases are respectively provided with a vertical groove, which is provided with a blocking surface at an end and a vertical wall.

BRIEF DESCRIPTION OF DRAWINGS

This invention is better understood by referring to the accompanying drawings, wherein.

DETAILED DESCRIPTION OF THE PREFERRED EMBODIMENT

Figure 1:
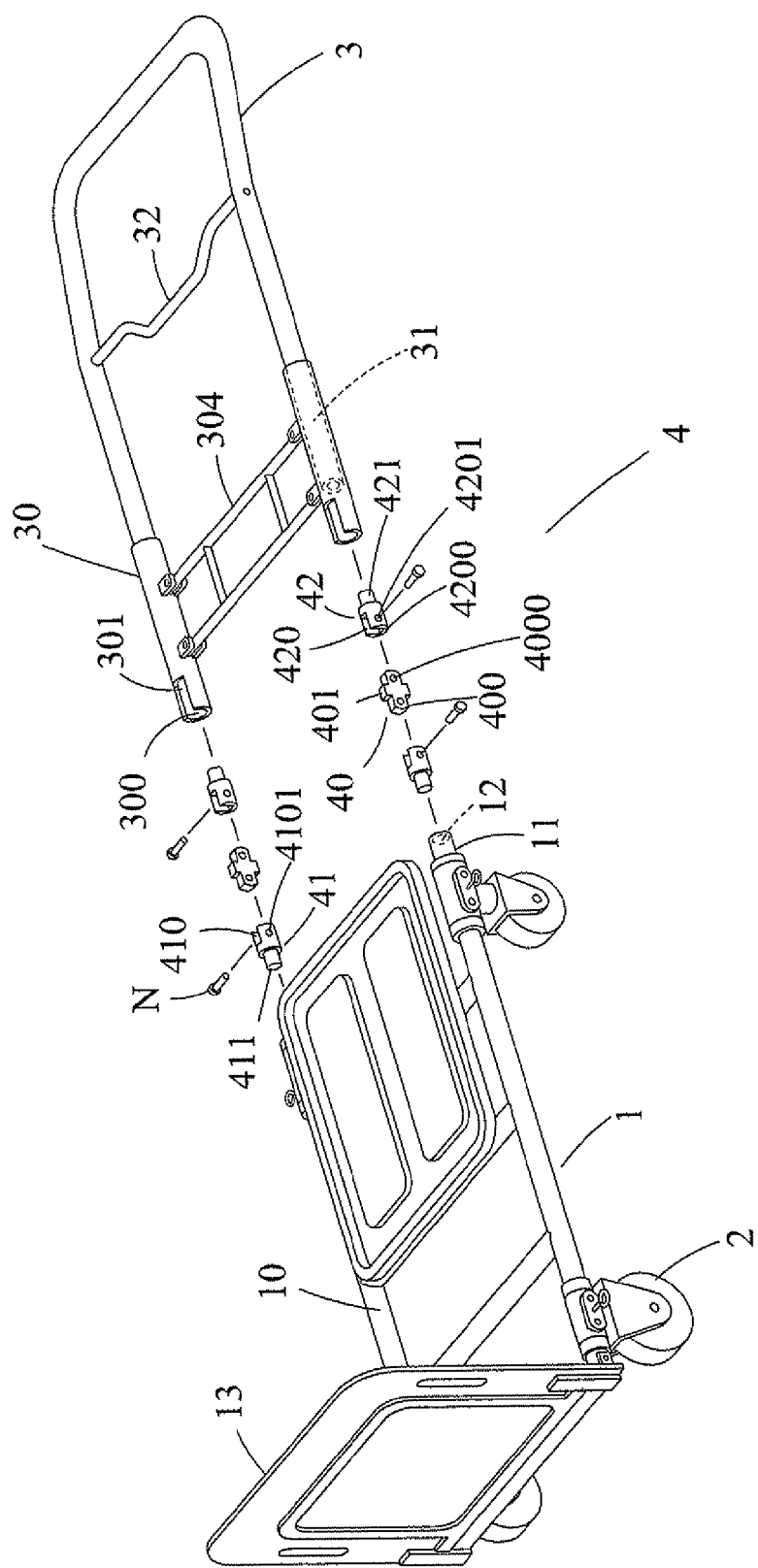
FIG. 1 is an exploded perspective view of a first preferred embodiment of a handcart in the present invention.
Figure 2:
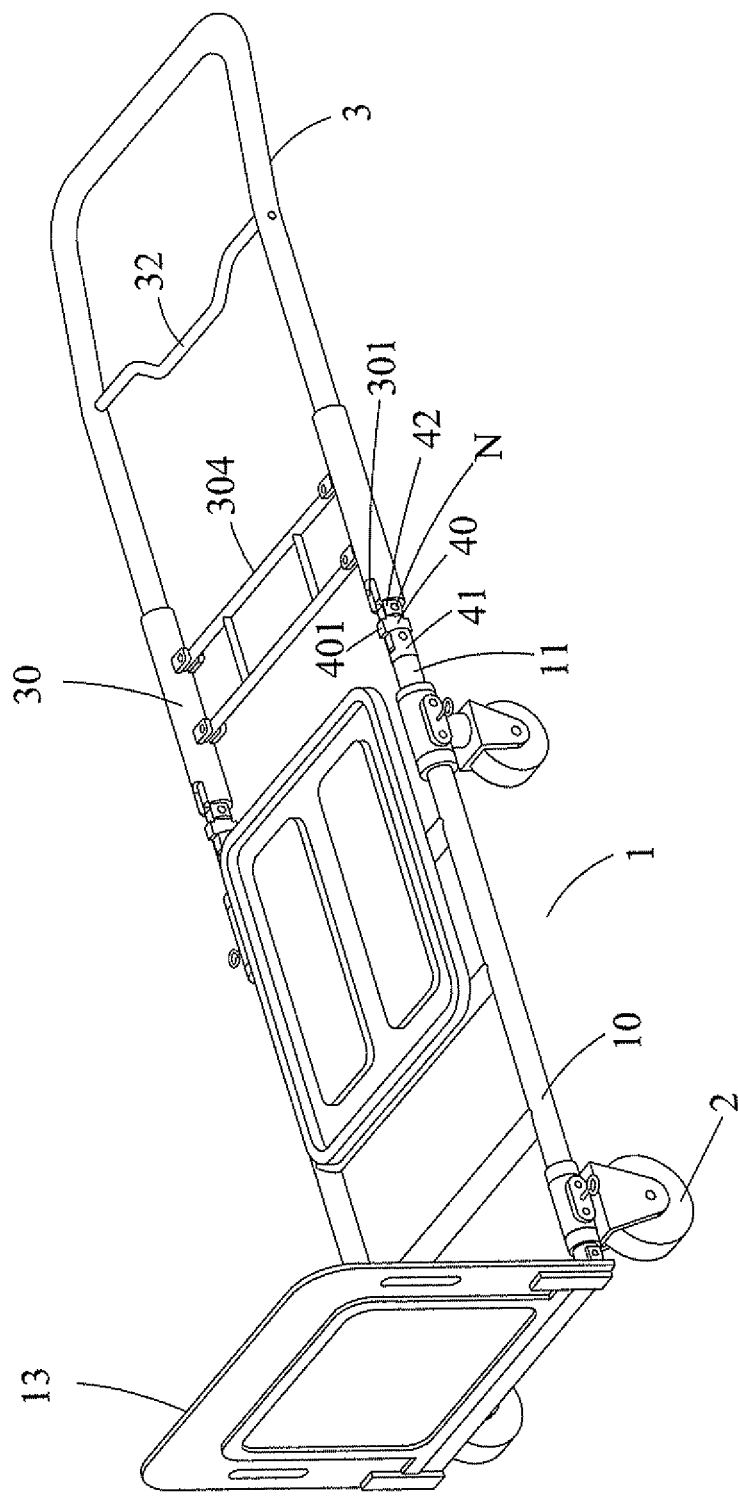
FIG. 2 is a perspective view of the first preferred embodiment of a handcart in the present invention.
Figure 3:
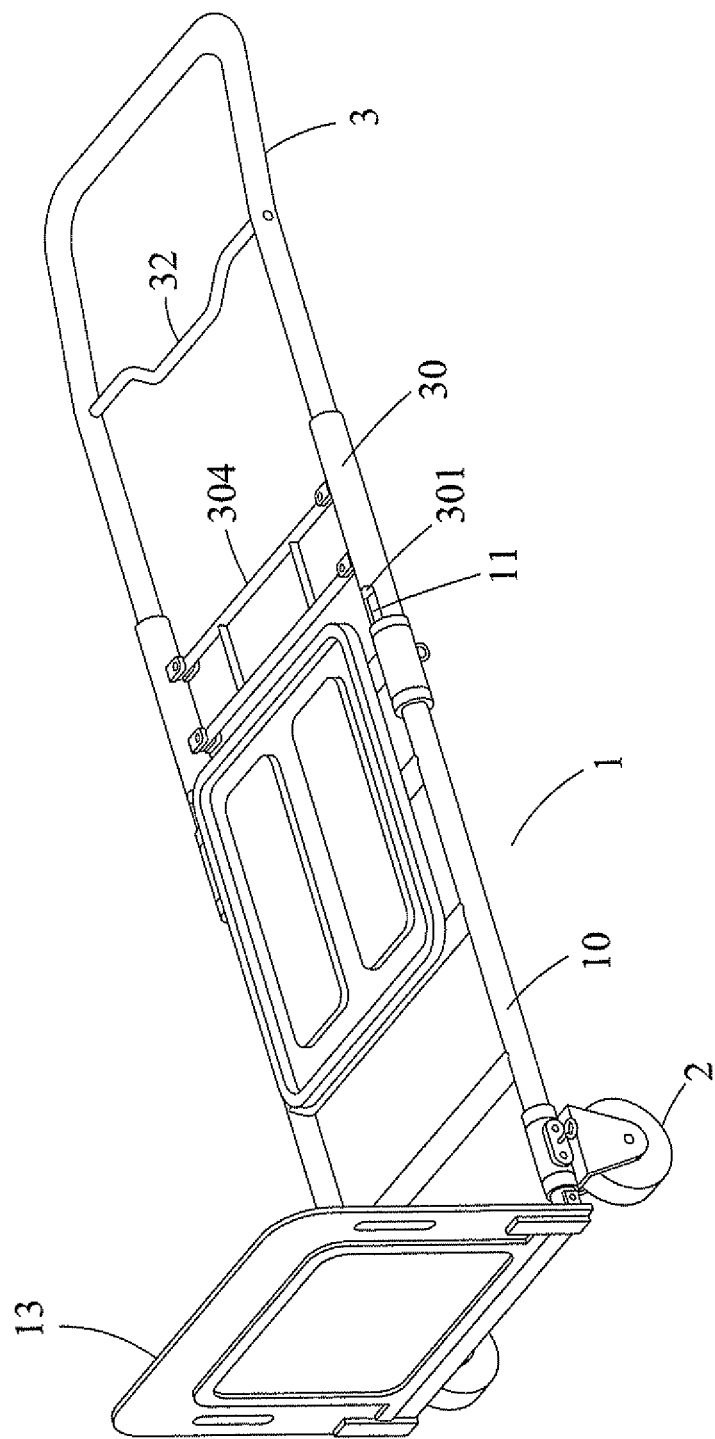
FIG. 3 is a perspective view of the first preferred embodiment of a handcart in the present invention, showing it transformed as a two-wheel handcart.
Figure 4:
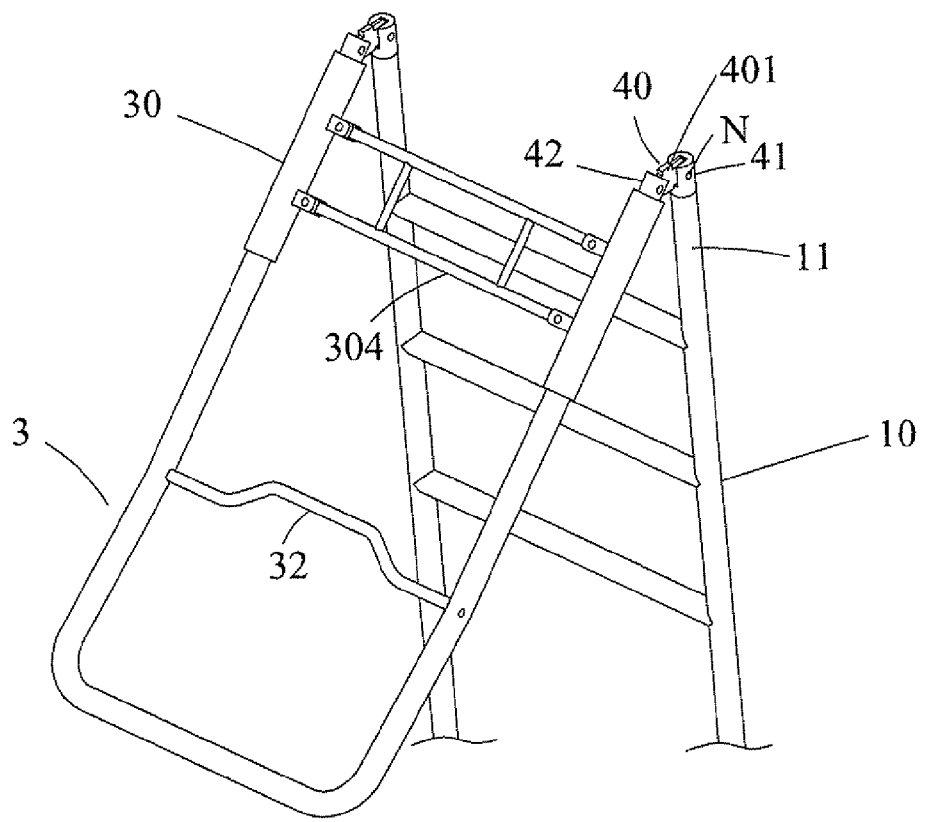
FIG. 4 is a perspective view of a joint assembly adjusted to let a grip bent against a main frame in the present invention.
Figure 5:
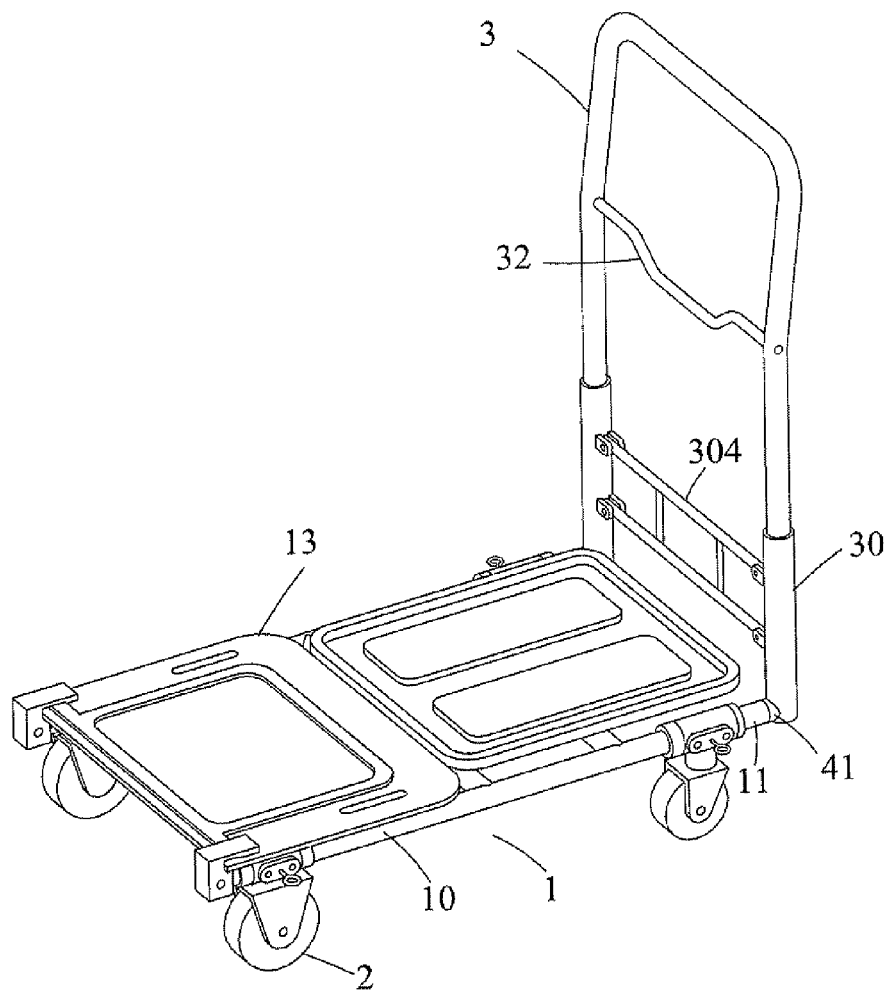
FIG. 5 is a perspective view of the first preferred embodiment of a handcart in the present invention, showing it transformed as a four-wheel handcart.
Figure 6:
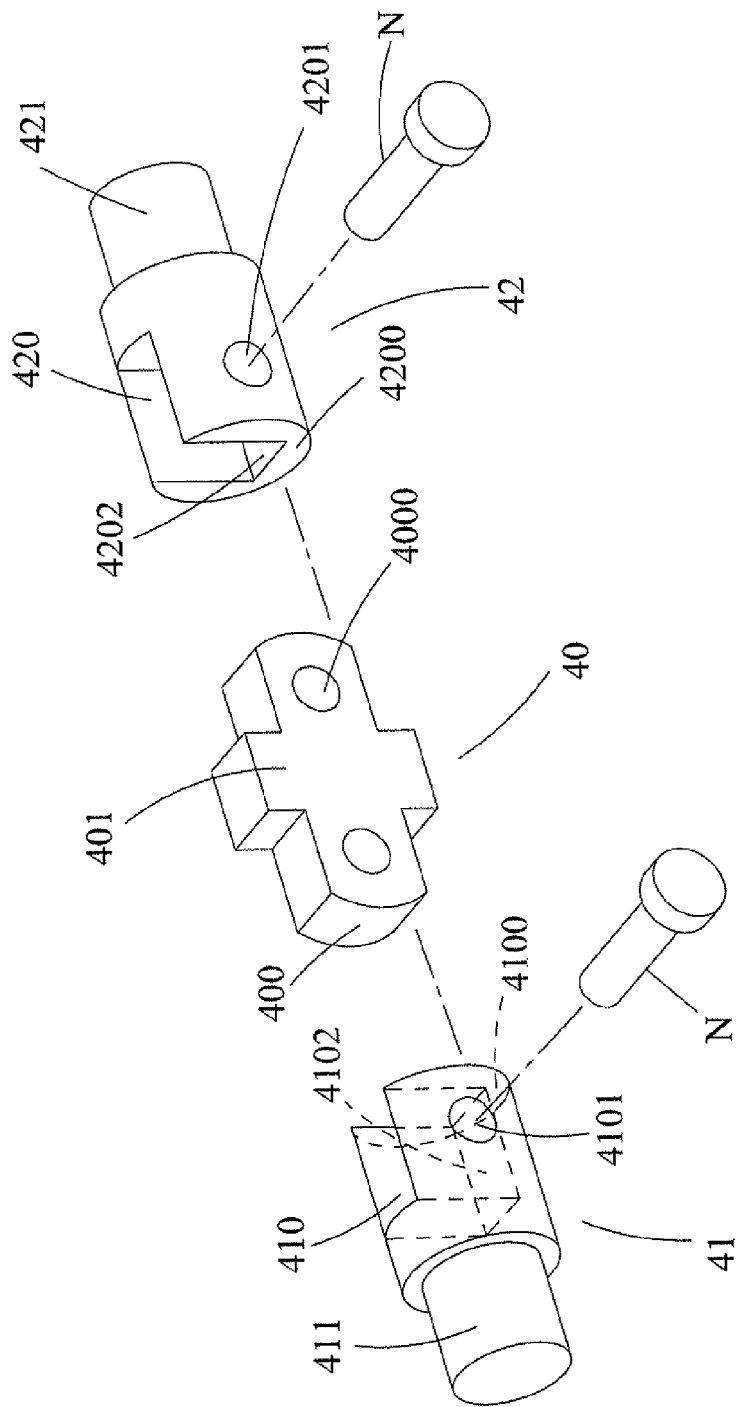
FIG. 6 is an exploded perspective view of the joint assembly in the present invention.
Figure 7:
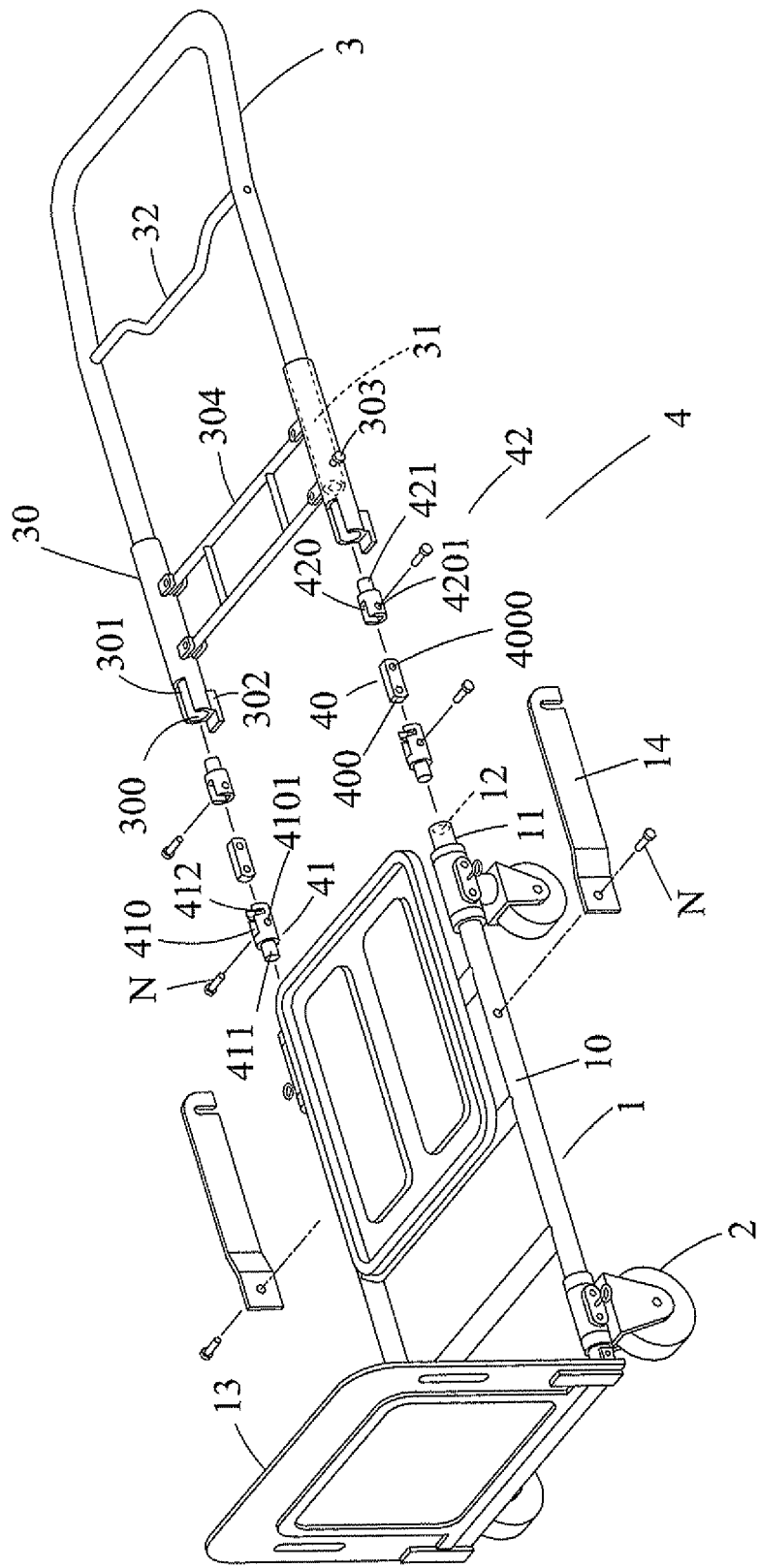
FIG. 7 is an exploded perspective view of a second embodiment of a handcart in the present invention.
Figure 8:
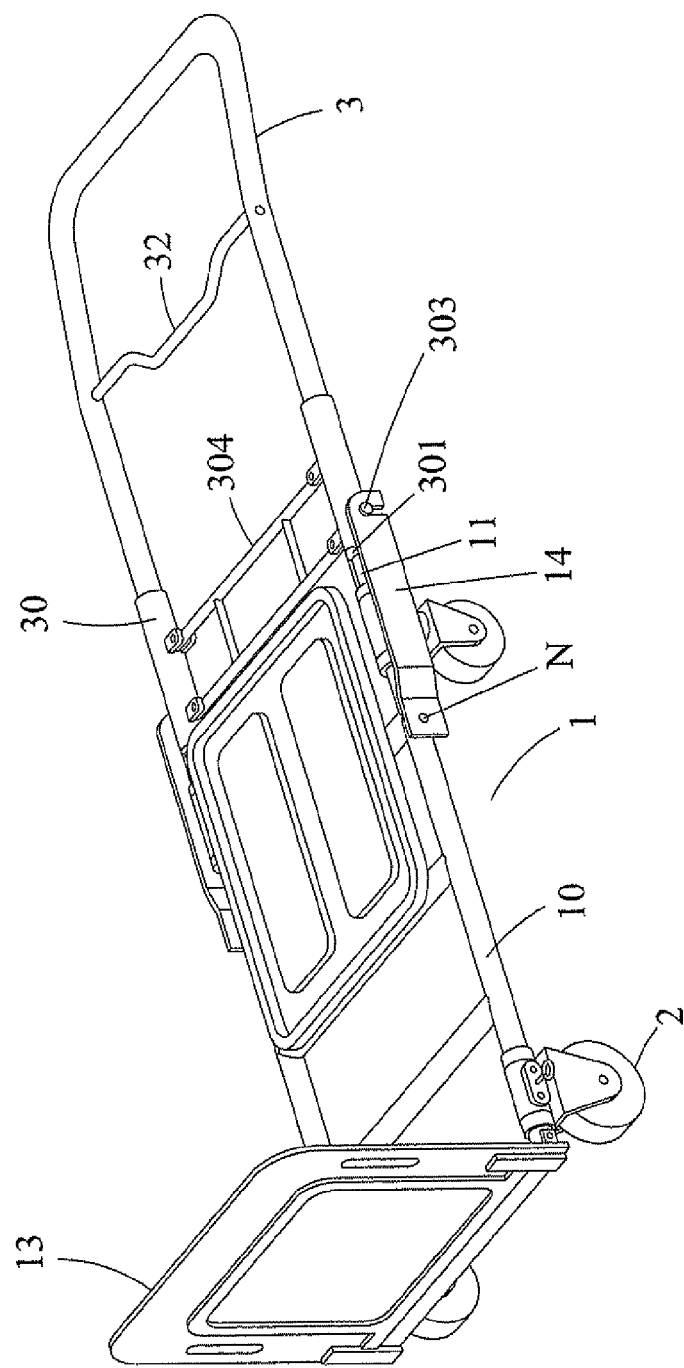
FIG. 8 is a perspective view of the second embodiment of a handcart in the present invention.
Figure 9:
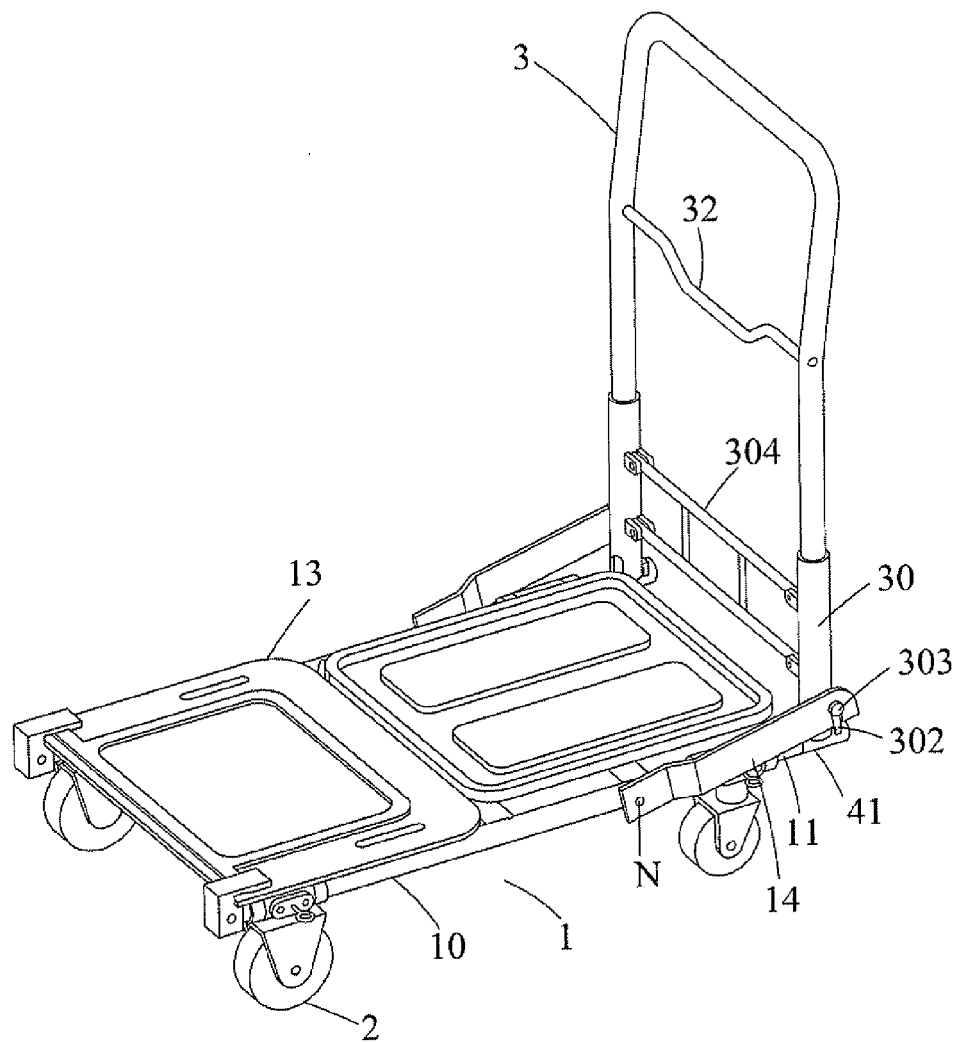
FIG. 9 is a perspective view of the handcart of the second embodiment formed as a four-wheel handcart in the present invention.
Figure 10:
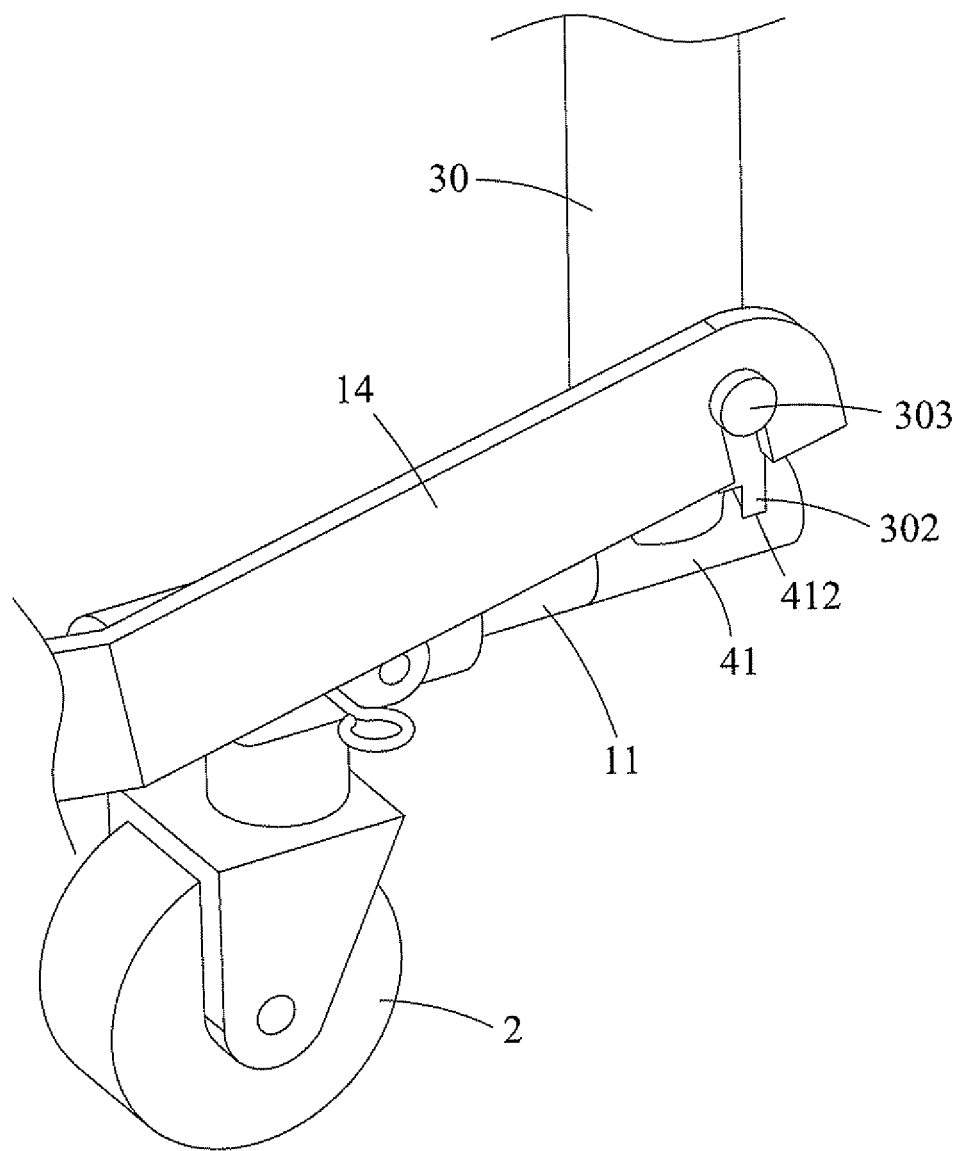
FIG. 10 is a magnified view of a reinforcing strip in the handcart of the second embodiment in the present invention.
Figure 11:
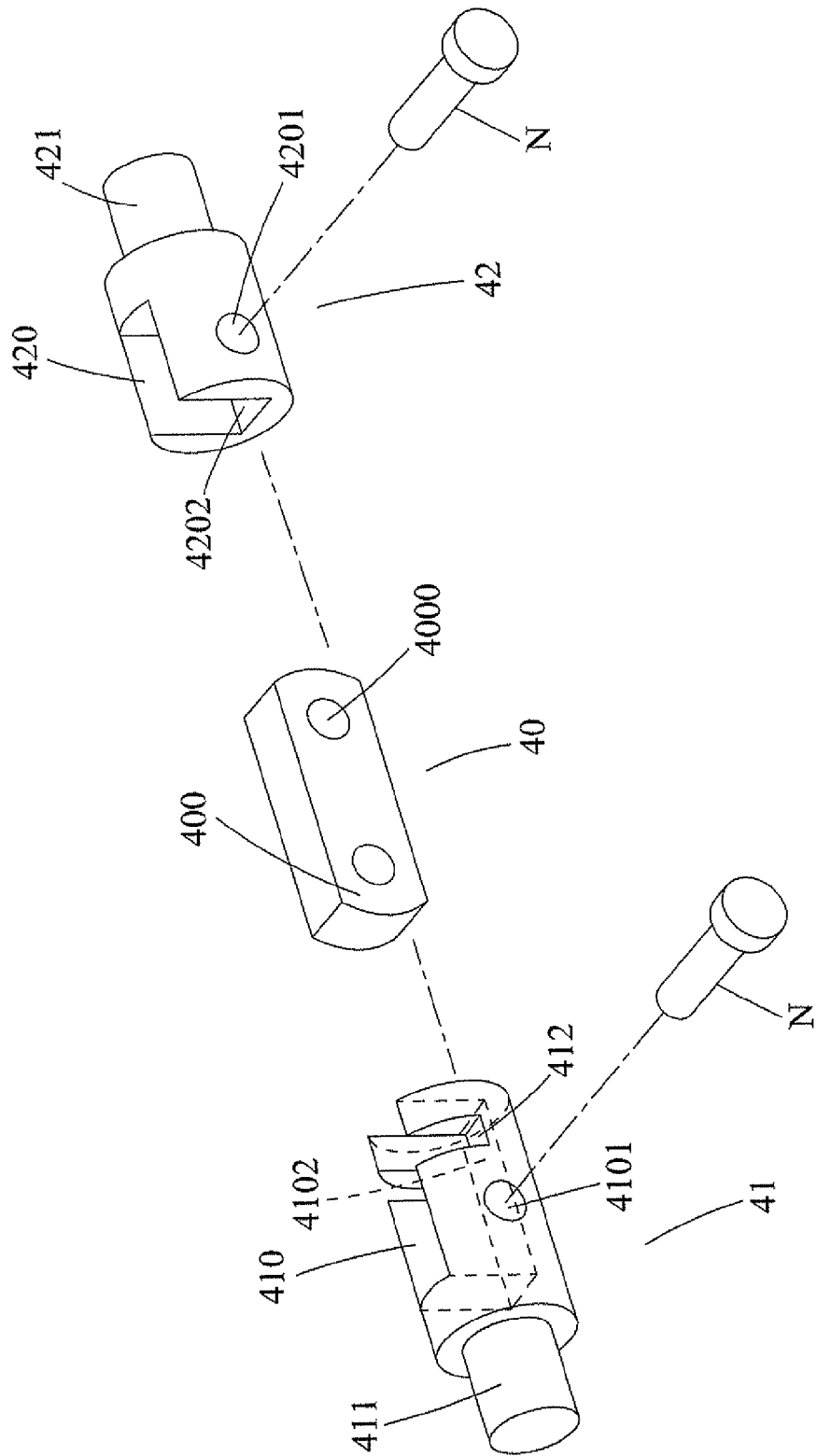
FIG. 11 is an exploded perspective view of a joint assembly in the second embodiment of a handcart in the present invention.

As shown in FIGS. 1~6, a first preferred embodiment of a handcart in the present invention includes a main frame 1, four wheels 2, a grip 3, two positioning sleeves 30, two joint assemblies 4, and plural positioning elements (N).

The main frame 1 is provided with a frame rod 10 that has two ends provided with a positioning member 11 and a fitting hole 12 respectively. A supporting plate 13 is placed on the frame rod 10.

Each of the wheels 2 is assembled with the frame rod 10. The grip 3 is assembled with the frame rod 10 of the main frame 1, having a fitting portion 31 in two ends respectively and a positioning bar 32 installed laterally between two parallel portions of the grip 3.

Then the positioning sleeves 30 respectively fit movably around each end of the grip 3, having a center hole 300 fitting around the fitting portion 31 of the grip 3 so that the positioning sleeves 30 can move back and forth relative to the grip 3. The positioning sleeves 30 are further provided with a U-shaped positioning groove 301 cut at a bottom end. Further a connecting rod unit 304 is fixed between the two positioning sleeves 30, consisting of two parallel horizontal rods and two parallel vertical rods fixed between the two horizontal rods, so that the two positioning sleeves may move together.

The two joint assemblies 4 are respectively assembled between the frame rod 10 of the main frame 1 and the grip 3, provided with a pivotal block 40, a left pivotal base 41, and a right pivotal base 42. The pivotal block 40 is nearly cross-shaped and formed with a semicircular pivotal member 400 respectively situated at two—left and right—ends and bored with a pivotal hole 4000, and two aligned—one upper and one lower—projections 401 in the intermediate portion.

The left and the right pivotal base 41 and 42 are respectively provided with a vertical groove 410, 420 at an inner end and a circular fitting member 411, 421 at the outer end. The vertical grooves 410 and 420 are L-shaped and respectively provided with a blocking surface 4100, 4200 on the inner end. The vertical grooves 410 and 420 are respectively provided with a crosswise pin hole 4101, 4201 and a bottom surface 4102, 4202.

The positioning elements (N) are used to keep the pivotal bases 41 and 42 in place after the pivotal block 40 is combined with the two pivotal bases 41 and 42, with the two semicircular pivotal members 400 respectively fitted in the vertical groove of the two pivotal bases 41 and 42. Thus, the two pivotal bases 41 and 42 may be bent up for nearly 90 degrees relative (or vertical) to the pivotal block 40.

In assembling, the pivotal bases 41 and 42 are connected together with the pivotal blocks 40 by means of the positioning elements (N) inserted in the pivotal holes 4101 and 4201, assembling the joint assemblies 4 initially. Then the circular fitting portions 411 and 421 are respectively fitted with the fitting holes 12 of the frame rod 10 of the main frame 1 and also with the fitting portion 31 combined with the grip 3, finishing the whole assembly of the handcart.

In using, when only two-wheels of the invention are to be used, the two rear wheels 2 are adjusted to become horizontal to the frame rod 2, and then the grip 3 together with the positioning sleeves 30 and the connecting rod unit 304 together is moved to align with the main frame 1, and then the left and the right pivotal bases 41 and 42 of the joint assemblies 4 are automatically moved to align with the main frame 1 and the grip 3, and the semicircular pivotal member 400 of the pivotal blocks 40 can easily turn in the vertical grooves 410 and 420 of the pivotal bases 41 and 42. When the projections 401 of the pivotal blocks 40 contact with the blocking surfaces 4100 and 4200 of the vertical grooves 410 and 420, the grip 3 and the main frame 1 become aligned. Subsequently the positioning sleeves 30 are pushed downward, covering totally the joint assemblies 4 and kept them in place, finishing forming the two-wheel handcart.

If the handcart of the first embodiment in the form of the two-wheels is to be transformed and used as a four-wheel one, two rear wheels 2 are adjusted to become vertical to the frame rod 10, and then the connecting rid unit 304 is pulled outward together with the positioning sleeves 30 and the grip 3, with the positioning sleeves 30 also moved outward and not surrounding the joint assemblies 4, and then the connecting rod unit 304 together with the positioning sleeves 30 and the grip 3 are bent for 90° relative to the main frame 1. Then the positioning sleeves 30 are pushed down and surround only the right pivotal bases 42, with the left pivotal bases 41 received in the U-shaped positioning grooves 301 stably. Now, this handcart has become a four-wheel one.

A second embodiment of a handcart in the invention, as shown in FIGS. 7 to 11, includes a main frame 1, four wheels 2, a grip 3, two joint assemblies 4 and plural positioning elements (N) as main components.

The main frame 1 has a frame rod 10 which has two ends respectively provided with a positioning member 11 and a fitting hole 12, and a supporting plate 13 is placed on the frame rod 10. Two reinforcing strips 14 are respectively fixed at an outer side of the frame rod 10.

The four wheels 2 are adjustably assembled with the frame rod 10.

The grip 3 is U-shaped, having two end portions combined movably with a positioning sleeve 30 fitting around each of the two end portions. Then the two positioning sleeves 30 are bendably linked with the frame rod 10 by means of the two joint assemblies 4. Each positioning sleeve 30 fits movably around each end of the grip 3, having a center hole 300 fitting around the fitting portion 31 of the grip 3 so that the positioning sleeves 30 can move back and forth relative to the grip 3. The positioning sleeves 30 are further provided respectively with a U-shaped positioning groove 301 cut at a bottom end, a positioning projection 302 fixed under the groove 301, and a fitting projection 303 formed at an outer side. Further, a connecting rod unit 304 is installed between the two positioning sleeves 30, enabling the two positioning sleeves 30 move together, The connecting rod unit 304 is composed of two parallel horizontal rods and two parallel vertical rods fixed between the two parallel horizontal rods.

The two joint assemblies 4 are respectively assembled between the frame rod 10 of the main frame 1 and the grip 3, composed of a pivotal block 40, a left pivotal base 41, and a right pivotal base 42. The pivotal block 40 is rectangular and formed with a semicircular pivotal member 400 respectively at two sides, and a pivotal hole 4000 bored in the pivotal member 400. The left and the right pivotal member 41 and 42 have one end provided with a vertical groove 410, 420, and the other end provided with a circular fitting member 411, 421 respectively. Further, a crosswise pin hole 4101, 4201 is bored to pass crosswise through the vertical groove 410, 420 respectively. The vertical groove 410, 420 respectively has a bottom surface 4102, 4202 for a left end of the pivotal block 40 to stand on in case the pivotal block 40 is turned up for 90°. The left pivotal base 41 is further provided with a fitting groove 412 across the vertical groove 410, and the fitting groove 412 has a width nearly the same as the thickness of the positioning projection 302.

If the pushcart of the second embodiment is used in a two-wheel one, two rear wheels 2 are adjusted in horizontal condition to the frame rod 10, and the joint assemblies 4 are kept in a line with the positioning sleeves 30.

If the pushcart of the second embodiment is to be transformed and used as a four-wheel one, firstly two wheels 2 condition Then the connecting rod unit 304 is pulled outward to let the positioning sleeves 30 move also outward to expose the joint assemblies 4. Two rear wheels 2 are turned to become vertical to the frame rod 10 from the horizontal condition to the frame rod 10 in the two-wheel handcart, Then the connecting rod unit 304, the positioning sleeves 30 and the grip 3 together are bent for 90° relative to the main frame 1, and then the positioning sleeves 30 are further pushed down to surround only the right pivotal base 42. Then the pivotal block 40 of the joint assembly 4 becomes in a straight line with the right pivotal base 42, vertical to the left pivotal base 41, i.e. becoming 90° relative to the left pivotal base 41. Now the positioning sleeves 30 are further pushed down, forcing the positioning projection 302 fit in the fitting groove 412 of the left pivotal base 41. Then a downward notch of the reinforcing strip 14 is made to fit with the fitting projection 303 of the positioning sleeves 30, so the pushcart is formed as the four wheel one.

Figure 12:
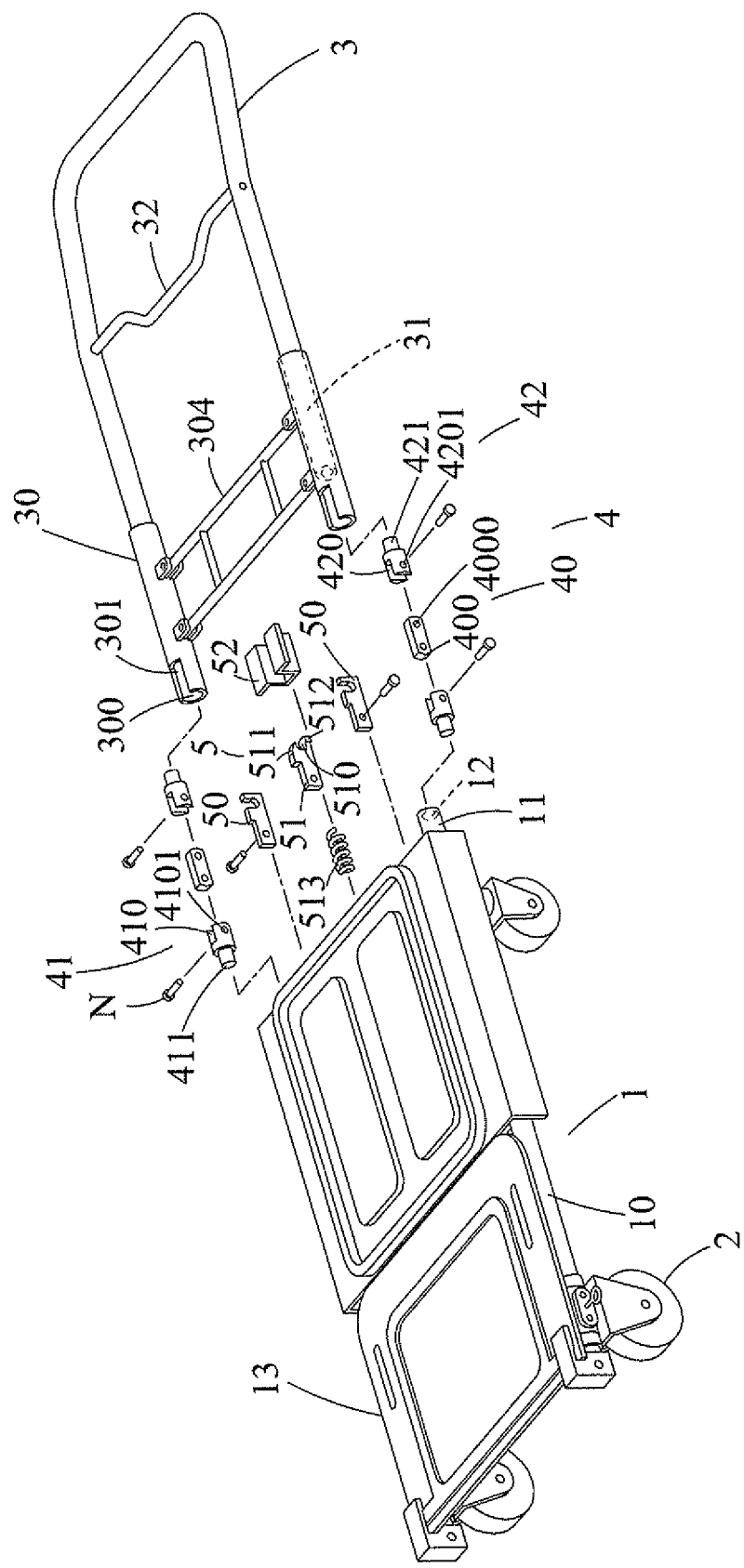
FIG. 12 is an exploded perspective view of a third embodiment of a handcart in the present invention.
Figure 13:
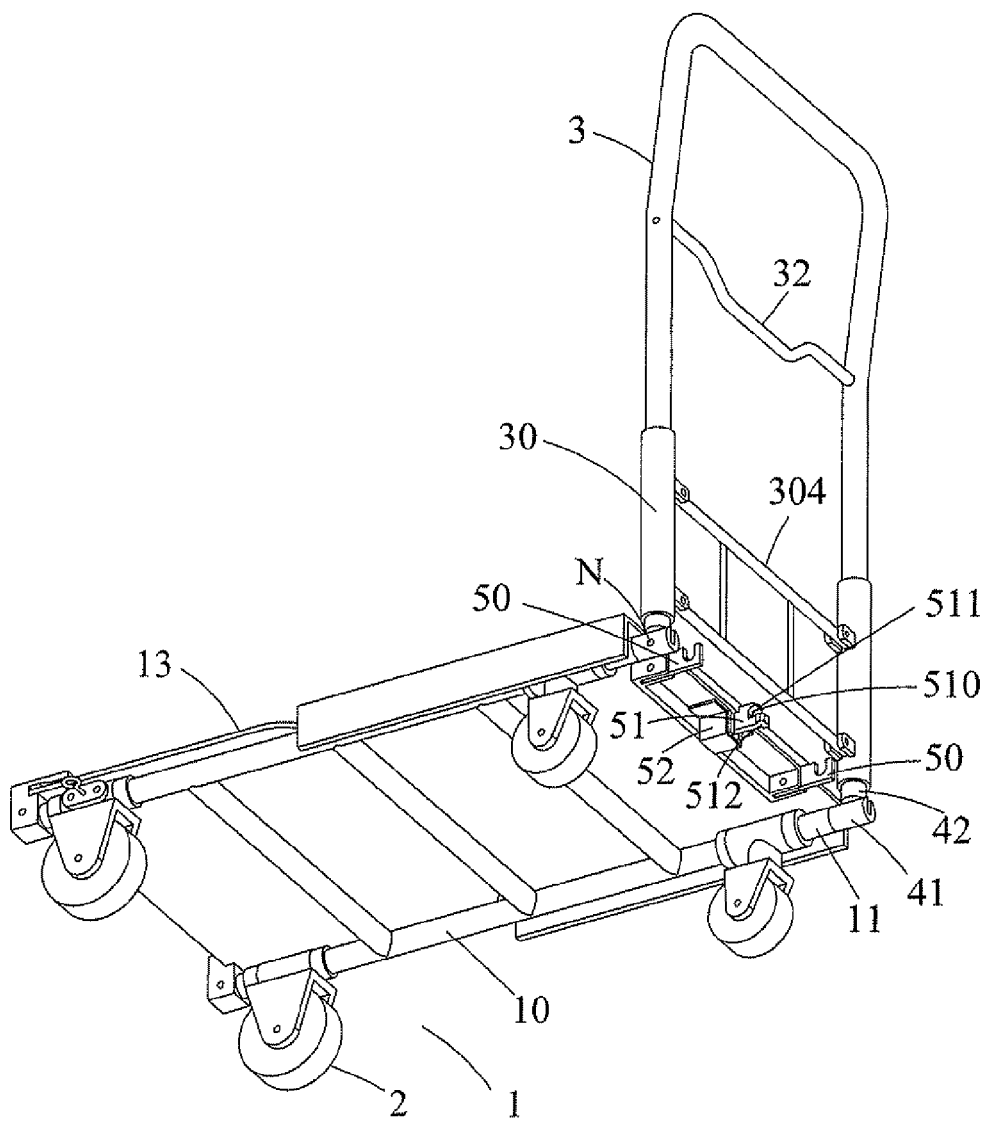
FIG. 13 is a perspective view of the third embodiment of a handcart in the presenting, showing it with a grip together with positioning sleeves bent 90° relative to a main frame but not yet pushed down to connect with a joint assembly.
Figure 14:
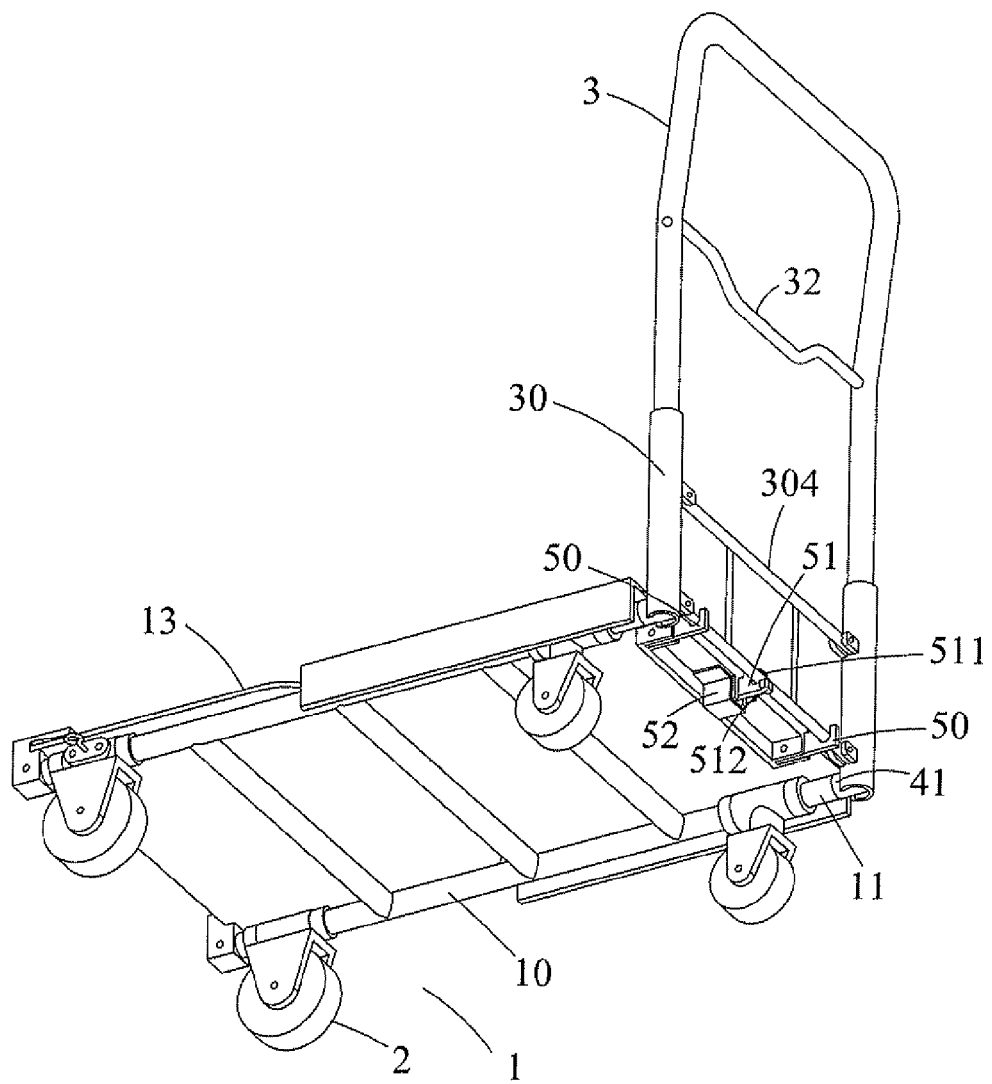
FIG. 14 is a perspective view of the handcart shown in FIG. 13, showing the grip together with the positioning sleeves pushed down to combine stably with the joint assemblies.

Next, a third embodiment of a handcart in the invention, as shown in FIGS. 12, 13 and 14, includes a main frame 1, four wheels 2, a grip 3, two joint assemblies 4, and a connecting rod unit securing unit 5, and plural positioning members (N). The main frame 1 has a frame rod 10 which has two ends respectively provided with a positioning member 11 and a fitting hole 12, and a supporting plate 13 is placed on the frame rod 10.

The four wheels are adjustably assembled with the frame rod 10.

The grip 3 is U-shaped, having two end portions combined movably with a positioning sleeves 30 fitting around each of the two end portions. Then the two positioning sleeves 30 are bendably linked with the frame rod 10 by means of the two joint assemblies 4. Each positioning sleeve 30 fits movably around each fitting portions 31 of the grip 3, having a center hole 300 fitting with the fitting portion 31 of the grip 3 so that the positioning sleeves 30 can move back and forth relative to the grip 3. The positioning sleeves 30 are further provided with a U-shaped positioning groove 301 cut at a bottom end, In addition, a connecting rod unit 304 is installed between the two positioning sleeves 304, enabling the two positioning sleeves 30 to move together. The connecting rod unit 304 is composed of two parallel horizontal rods and two parallel vertical rods fixed between the two parallel horizontal rods.

The two joint assemblies 4 are respectively assembled between the frame rod 10 of the main frame 1 and the grip 3, composed of a pivotal block 40, a left pivotal base 41, and a right pivotal base 42. The pivotal block 40 is rectangular and formed with a semicircular pivotal member 400 respectively at two sides, and a pivot hole 4000 bored in the pivotal member 400. The left and the right pivotal base 41 and 42 have one end provided with a vertical groove 410, 420 and the other end provided with a fitting member 411, 421 respectively. Further, a crosswise pin hole 4101, 4201 is bored to pass crosswise through the vertical groove 410, 420 respectively.

The connecting-rod-unit securing unit 5 is composed of two positioning members 50, a movable member 51, a groove member 52 and a spring 513. The two position members 50 and the groove member 52 are fixed with the main frame 1, with the two positioning members 50 located at two sides of the groove member 52. Then the movable member 51 is movably placed in a center groove of the groove member 52, having an end hooked with an end of the spring 513 that has another end fixed on the frame 1. The movable member 51 has a fitting notch 510, a guide curve 511 and a stop bent tip 512 at another end, and the two positioning members 50 also have a fitting notch at one end. The fitting notch 510 and the fitting notches of the two positioning members 50 can come in a straight line for the lower rod of the connecting rod unit 304 to fit therein so that the connecting rod unit 304 together with the positioning sleeves 30 and the grip 3 may be kept stable in the vertical position relative to the main frame, not easily moving around.

If the handcart of the third embodiment is used as a two-wheel one, the two rear wheels 2 are adjusted to become horizontal to the frame rod 10, and the joint assemblies 4 are kept in a line with the positioning sleeves 30, surrounded by the positioning sleeves.

If the two-wheel handcart of the third embodiment is to be transformed and used as a four-wheel one, firstly the two rear wheels 2 are turned to become vertical to the frame rod 10 from the horizontal condition in the two-wheel handcart. Then the connecting rod unit 304 is pulled outward to let the positioning sleeves 30 also pulled outward and expose the joint assemblies 4, and then connecting rod 304, the positioning sleeve 30 and the grip 3 together are bent for 90° relative to the main frame 1, and then the positioning sleeves 30 are further pushed down to surround the right pivotal base 42, and the pivotal block 40 becomes vertical, i.e. 90° relative to the left pivotal base 41 connected with the frame rod 10 in a line. And the connecting rod unit 304 is made to move down with the positioning sleeves 30, letting the lower horizontal rod of the connecting rod unit 304 fitting in the fitting notches of the positioning member 50 and the fitting notch 510 of the movable member 51. Then the handcart is formed as the four wheel one.

The invention has the following advantages as can be seen from the foresaid description.

1. The grip 3 can be kept stably in position by the positioning sleeves 30 and the joint assemblies 4, impossible to move at random when the handcart is formed in a flat condition.

2. The main frame 1 and the grip 3 are adjusted by the joint assemblies 4 with correct movement and convenience.

3. The invention can be alternatively used as a two-wheel and four-wheel handcart according to a user's need, achieving a convenient multi-function handcart.

4. The wheels 2 and the grip 3 can be collapsed in a minimum bulk for economic delivery or saving space, because the wheels 2 and the grip 3 are foldable.

While the preferred embodiment of the invention has been described above, it will be recognized and understood that various modifications may be made therein and the appended claims are intended to cover all such modifications that may fall within the spirit and scope of the invention.

What is claimed is:

1. A handcart comprising:

a main frame provided with a frame rod that has two ends respectively provided with a positioning member and a fitting hole;

a grip having two ends, each end pivotally assembled with a positioning sleeve which is also pivotally combined with said frame rod of said main frame via two joint assemblies;

said positioning sleeves movably fitting around said end of said grip and provided with a U-shaped positioning groove at an end;

a connecting rod unit connected between said two positioning sleeves and composed of two parallel horizontal rods and two parallel vertical rods fixed between said two parallel horizontal rods, enabling said two positioning sleeves to move together;

said two joint assemblies installed between said main frame and said grip, said joint assemblies enabling said grip to become aligned to said main frame or to become vertical to said main frame;

said joint assemblies respectively consisting of a pivotal block, a left pivotal base and a right pivotal base, said pivotal block being cross-shaped and having two projections, one upper and one lower, in an intermediate portion, said left and right pivotal base respectively provided with a vertical groove, said vertical groove formed with a blocking surface at an end and a vertical groove formed with a blocking surface at an end and said vertical groove provided with a crosswise pin hole and a said pivotal block of each joint assembly allows said right pivotal base to bend up for 90° relative to said bottom surface of said vertical groove of said left pivotal base so that said connecting rod unit and said positioning sleeves together with said grip may be bent up and down accurately and stably, easily handling for aligning or bending for 90° said grip relative to said main frame.

2. The handcart as claimed in claim 1, wherein said projections of said pivotal blocks of said joint assemblies contact with and stop by said blocking surface of said vertical grooves so that the adjustment of said grip and said main frame is very stable and simple.

3. A handcart comprising:

a main frame provided with a frame rod that has two ends respectively provided with a positioning member and a fitting hole;

a grip having two ends assembled respectively with a positioning sleeve which is also pivotally combined with said frame rod of said main frame by means of two joint assemblies;

each said positioning sleeve movably fitting around said each end of said grip and provided with a U-shaped positioning groove at an end and a fitting projection formed under said positioning groove;

said two joint assemblies installed between said main frame and said grip, said joint assemblies enabling said grip to become aligned to said main frame or to become vertical to said main frame;

said joint assemblies respectively consisting of a pivotal block, a left pivotal base and a right pivotal base, said pivotal block shaped rectangular and having two pivotal members at two sides, said left and said right pivotal base provided respectively with a vertical groove at one end and a circular fitting member at another end and said vertical groove provided with a bottom surface, a crosswise pin hole and a crosswise fitting groove; and said pivotal block of each joint assembly allows said right pivotal base to bend up for nearly 90° relative to said bottom surface of said vertical groove of said left pivotal base so that said grip and together with said positioning sleeves may be bent up and down accurately and stably, easily handling for aligning or bending for 90° said grip relative to said main frame.

4. A handcart comprising:

a main frame provided with a frame rod that has two ends respectively provided with a positioning member and a fitting hole;

a grip having two ends, each end assembled respectively with a positioning sleeve which is also pivotally combined with said frame rod of said main frame by means of two joint assemblies; each positioning sleeve movably fitting around each end of said grip and provided with a U-shaped positioning groove at an end, a connecting rod unit provided between said two positioning sleeves and consisting of two parallel horizontal rods and two parallel vertical rods fixed between said two parallel horizontal rods so that said two positioning sleeves may move together;

said two joint assemblies installed between said main frame and said grip, said joint assemblies enabling said grip to become aligned to said main frame or to become vertical to said main frame, said joint assemblies respectively consisting of a pivotal block, a left pivotal base and a right pivotal base, said pivotal block shaped rectangular and having two pivotal members, said two pivotal members bored with a pivotal hole, said left and said right pivotal base provided respectively with a vertical groove at one end and a circular fitting member, and said vertical groove provided with a crosswise pin hole and a bottom surface;

said pivotal block of each joint assembly allows said right pivotal base to bend up for 90° relative to said bottom surface of said vertical groove of said left pivotal base so that said grip and said positioning sleeves and said connecting rod unit together may be bent up and down accurately and stably, easily handling for aligning or bending for 90° said grip relative to said main frame; and two reinforcing strips respectively having one end fixed on one side of said main frame and another end bored with a downward notch, said downward notch fitting with said fitting projection of said positioning sleeves so as to maintain stably a vertical condition of said positioning sleeves relative to said main frame.

5. A handcart comprising:

a main frame provided with a frame rod that has two ends respectively provided with a positioning member and a fitting hole;

a grip having two ends, each and assembled respectively with a positioning sleeve which is pivotally combined with said frame rod of said main frame by means of two joint assemblies; each positioning sleeve movably fitting around each end of said grip and provided with a U-shaped positioning groove at an end, a connecting rod unit provided between said two positioning sleeves and consisting of two parallel horizontal rods and two parallel vertical rods fixed between said two parallel horizontal rods so that said two positioning sleeves may move together;

said two joint assemblies installed between said main frame and said grip, said joint assemblies enabling said grip to become aligned to said main frame or to become vertical to said main frame, said joint assemblies respectively consisting of a pivotal block, a left pivotal base and a right pivotal base, said pivotal block shaped rectangular and having a pivotal member at two sides, said pivotal member bored with an pivotal hole, said left pivotal base and said right pivotal base provided respectively with a vertical groove at one end and a circular fitting member at another end;

said pivotal block of each joint assembly allows said right pivotal base to bend up for 90° relative to said vertical groove of said left pivotal base so that said grip together with said positioning sleeves and said connecting rod unit may be bent up and down accurately and stably, easily handling for aligning or bending for 90° said grip relative to said main frame; and a connecting-rod-unit securing unit consisting of two positioning members fixed with said main frame and having a fitting notch at one end, a groove member fixed with said main frame, a movable member having a fitting notch, a guide curve and a stop bent tip at one end and fitting movably in a central groove of said groove member, a spring having one end hooked with an end of said movable member and another end fixed with said main frame, said notches of said two positioning members and said movable member coming in a line so that a lower rod of said connecting rod unit between said two positioning sleeves fit in said fitting notches of said two positioning members and said movable member, keeping stably said grip together with said positioning sleeves in a vertical condition relative to said main frame.

* * * * *